(12) United States Patent
McCann et al.

(10) Patent No.: US 9,318,281 B2
(45) Date of Patent: Apr. 19, 2016

(54) STEERING WHEEL ASSEMBLY WITH USER CONTROLS

(71) Applicants: Gerald M. McCann, Bay City, MI (US);
Andrew D. Moran, Essexville, MI (US);
Frederick J. Berg, Auburn, MI (US);
Richard P. Nash, Frankenmuth, MI (US)

(72) Inventors: Gerald M. McCann, Bay City, MI (US);
Andrew D. Moran, Essexville, MI (US);
Frederick J. Berg, Auburn, MI (US);
Richard P. Nash, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 599 days.

(21) Appl. No.: 13/750,146

(22) Filed: Jan. 25, 2013

(65) Prior Publication Data
US 2013/0192967 A1    Aug. 1, 2013

Related U.S. Application Data

(60) Provisional application No. 61/591,517, filed on Jan. 27, 2012.

(51) Int. Cl.
*B60L 1/00* (2006.01)
*H01H 13/76* (2006.01)
*B60R 16/02* (2006.01)

(52) U.S. Cl.
CPC ............... *H01H 13/76* (2013.01); *B60R 16/02* (2013.01)

(58) Field of Classification Search
CPC .............................. H01H 13/76; B60R 16/02
USPC .................................................. 307/9.1, 10.1
See application file for complete search history.

(56) References Cited

U.S. PATENT DOCUMENTS

| | | | | |
|---|---|---|---|---|
| 5,855,144 | A * | 1/1999 | Parada | 74/552 |
| 6,956,952 | B1 * | 10/2005 | Riggs | 381/86 |
| 2011/0198201 | A1 * | 8/2011 | Chuang | 200/61.54 |

* cited by examiner

*Primary Examiner* — Hal Kaplan
(74) *Attorney, Agent, or Firm* — Cantor Colburn LLP

(57) ABSTRACT

A steering wheel assembly comprises a plurality of control elements disposed on a user-accessible surface of the steering wheel assembly. Each of the plurality of control elements has a plurality of user-selectable operational states and is electrically coupled to a corresponding branch of an electric circuit. The electric circuit defines an output node and is configured to produce a single output signal at the output node. Each of the plurality of control elements is configured for affecting the single output signal based on an active one of the plurality of user-selectable operational states of the respective one of the plurality of control elements. The single output signal is indicative of the active ones of the plurality of user-selectable operational states for each of the plurality of control elements.

19 Claims, 3 Drawing Sheets

STEERING WHEEL ASSEMBLY WITH USER CONTROLS

RELATED APPLICATION

The present patent application claims the benefit of priority from U.S. provisional patent application No. 61/591,517 filed on Jan. 27, 2012.

BACKGROUND OF THE INVENTION

The present invention relates generally to vehicle steering wheels and, more specifically, to systems and methods for providing control functions on a steering wheel.

A steering wheel provides a convenient location to present controls to a vehicle operator. For example, a steering wheel may include a number of control elements with each being configured for effecting control over one or more vehicle functions or features. Unfortunately, available space on the steering wheel limits the size and/or quantity of control elements that may be placed on the steering wheel.

In addition to constraints related to availability of space, other constraints may be imposed by the need to carry signals dispatched from each control element through the structure of the steering wheel to a control apparatus located off the rotating portion of the steering wheel. In many steering wheel applications, an electrical signal from each steering-wheel-mounted control element is transmitted from the rotating portion to a non-rotating portion via a sliding contact apparatus such as a slip ring (a series of spring arms that contact and follow a corresponding track as the steering wheel rotates) or a hard-wired connection such as a clock spring, wire coil, or wire tape (each of which including a series of wires wrapped about the steering wheel axis, with the wires being wound and unwound as the steering wheel rotates). In each of these cases, the quantity of electrical connections (i.e., leads) is limited by the necessity to transmit signals from the rotating portion of the steering wheel to a non-rotating portion for processing by a control apparatus such as a vehicle body controller.

In a conventional system, each control element (e.g., push button, toggle switch, slider, dial, etc.) dispatches a signal to be processed by the control apparatus so as to affect control over a single, unique vehicle function or feature. Where signals from more than one control element are to be carried over a single connection to the control apparatus, a system of prioritization (e.g., whereby only the highest priority function is activated whenever more than one control element is asserted simultaneously) must be pre-programmed or hard-wired into the circuit.

For example, a conventional resistive switch ladder may be configured such that the actuation of the switch element of the highest priority would results in an output voltage corresponding to that highest priority switch element. In such a conventional system, regardless how many additional switches with lower priority are actuated, the output voltage will not change, instead remaining at a level corresponding to the highest priority switch. It should be appreciated that, in order to accommodate multiple control elements while avoiding the above-described over-riding of lower priority control elements, a separate control element is required for each feature or function to be controlled. Therefore, while practical considerations of space and transmission capacity may tend to limit the number of control elements that a conventional system can accommodate, the demand for increased functionality, controllability, and user convenience tend to call for an increased quantity of control elements on the steering wheel.

Accordingly, it is desirable to have a system and method for providing control, via steering-wheel-mounted control elements, over an increased quantity of unique vehicle functions and features without increasing the quantity of steering-wheel-mounted control elements.

SUMMARY OF THE INVENTION

In an exemplary embodiment, a steering wheel assembly comprises a plurality of control elements disposed on a user-accessible surface of the steering wheel assembly. Each of the plurality of control elements has a plurality of user-selectable operational states and is electrically coupled to a corresponding branch of an electric circuit. The electric circuit defines an output node and is configured to produce a single output signal at the output node. Each of the plurality of control elements is configured for affecting the single output signal based on an active one of the plurality of user-selectable operational states of the respective one of the plurality of control elements. The single output signal is indicative of the active ones of the plurality of user-selectable operational states for each of the plurality of control elements.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
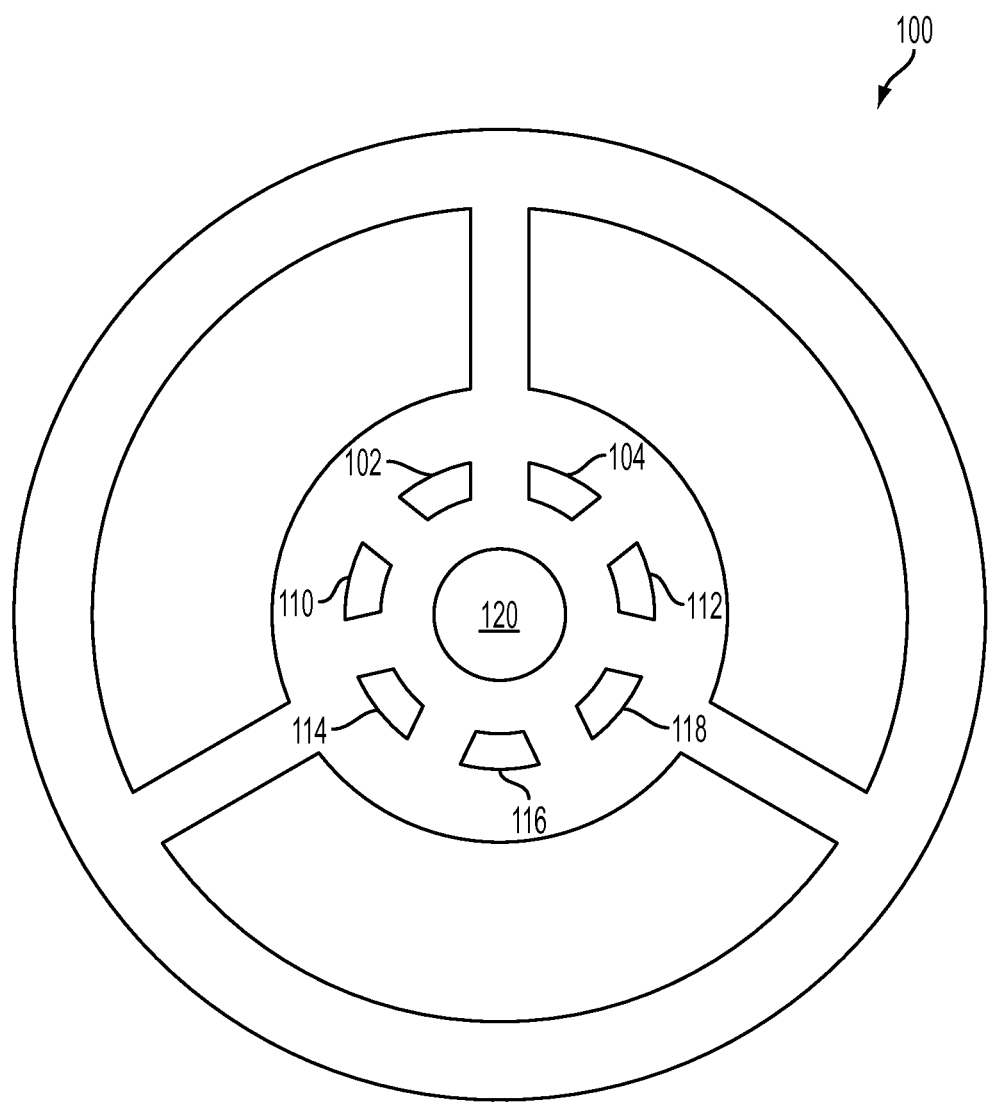
FIG. 1 is a drawing showing an exemplary steering wheel with two controls.

Referring now to the Figures, where the invention will be described with reference to specific embodiments, without limiting same, FIG. 1 shows an exemplary steering wheel assembly 100 having a first control element 102 and a second control element 104, each being disposed on a user-accessible surface of the steering wheel assembly 100. In an exemplary embodiment, both the first control element 102 and the second control element 104 are configured as push buttons, each being configured as an electrical switch, with a corresponding branch of an electric circuit. More specifically, in an exemplary embodiment, both the first control element 102 and the second control element 104 are configured so as to be actuated by pressing on an outer surface such that, when pressed, a corresponding circuit branch including the corresponding electrical switch portion of the control element 102, 104 is closed, and the corresponding resistance across the switch element decreases to a substantially lower value, such as approximately zero. When not pressed, a corresponding circuit branch including the switch portion of the control element 102, 104 is open, and the corresponding resistance across the switch element increases to a substantially greater value, such as infinite resistance. Thus, each of the first control element 102 and the second control element 104 are configured to operate in an activated state (corresponding to being pressed and to the closing of the corresponding circuit branch) and in an inactive state corresponding to the opening of the corresponding circuit branches. It should be appreciated that, at a given time, for each control element, there may be only one active state out of the plurality of user-selectable operational states.

Figure 2:
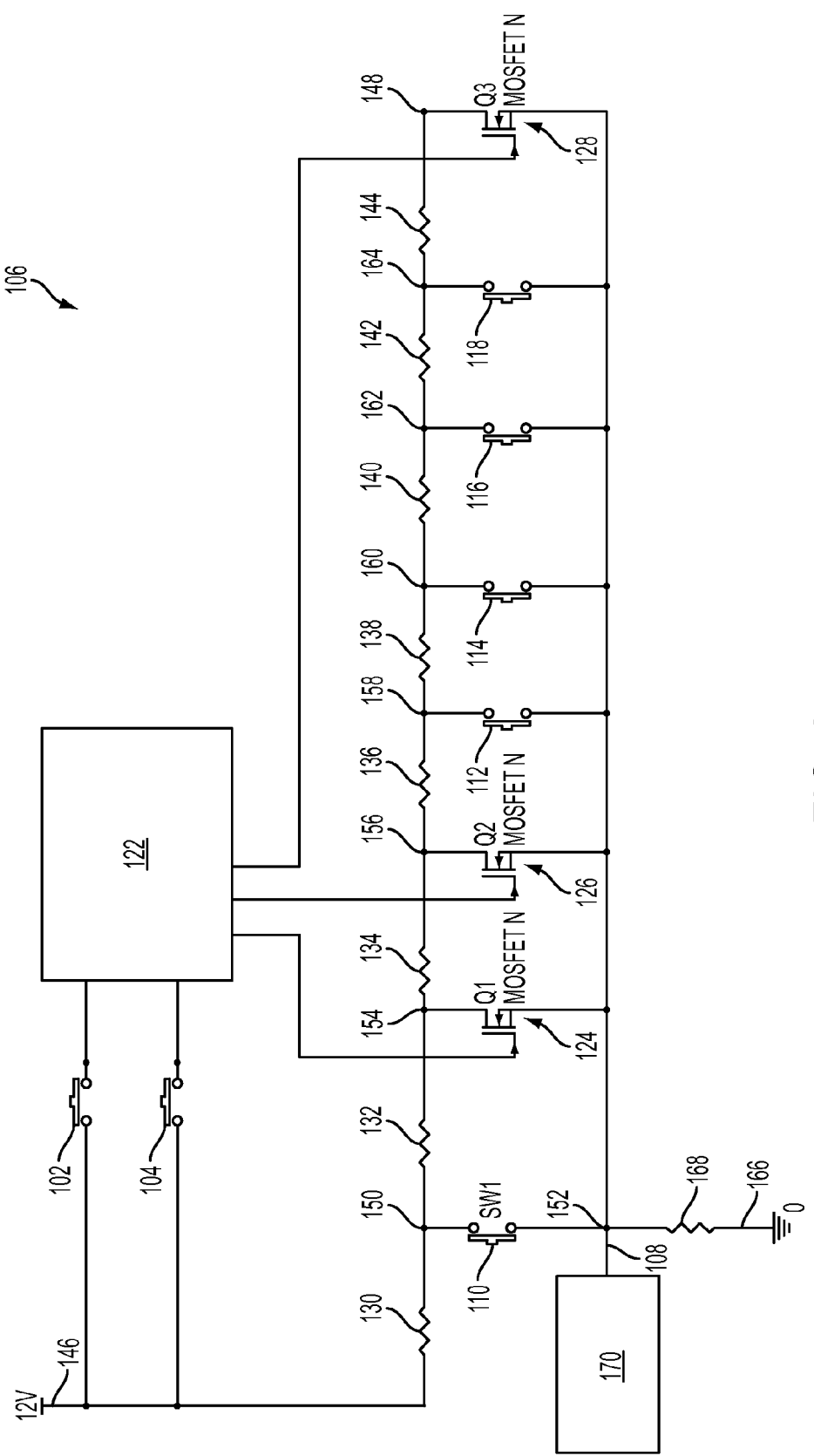
FIG. 2 is a schematic drawing showing an exemplary circuit for providing enhanced functionality for the two controls shown in FIG. 1.

In an exemplary embodiment, as shown in FIG. 2, the first control element 102 and the second control element 104 are electrically coupled to respective branches of a circuit 106. Circuit 106 is configured to produce a single output signal 108 that depends upon both the states of both the first control element 102 and the second control element 104. In operation, in regard to the first control element 102 and the second control element 104, a vehicle operator may choose to either: (a) actuate neither of the control elements 102, 104, leaving both the first control element 102 and the second control element 104 in inactive states; (b) actuate only the first control element 102, placing the first control element 102 in an active state and leaving the second control element 104 in an inactive state; (c) actuate only the second control element 104, leaving the first control element 102 in an inactive state and placing the second control element 104 in an active state; or (d) actuate both the first control element 102 and the second control element 104, placing both the first control element 102 and the second control element 104 in an active state. Thus, each of the control elements 102, 104 is configured for affecting the single output signal 108 based on an active one of the plurality of user-selectable operational states of the respective control element 102, 104.

Accordingly, circuit 106, with the two possible states for each of the two control elements, provides four possible output signals from simultaneous operation of two control elements. In this way, circuit 106 may provide enhanced functionality by facilitating control over four functions or features of the vehicle using only two control elements. Exemplary vehicle functions and features may include vehicle entertainment system features, climate control system features, vehicle lighting features, or other functions of the vehicle.

In an exemplary embodiment, in addition to the first and second control elements, the steering wheel 100 also includes a third control element 110, a fourth control element 112, a fifth control element 114, a sixth control element 116, a seventh control element 118, and an eighth control element 120. It should be appreciated that the circuit 106 may be configured so as to provide for control of unique vehicle functions corresponding to each of these control elements and/or to provide for unique output signals corresponding to simultaneous actuation of various combinations of these additional control elements. Accordingly, a significant increase in functionality may be produced without substantially increasing the number of control elements or the need for conductors to carry signals from the rotating portion of the steering wheel 100 to a stationary structure where a microprocessor, such as in the body controller, may reside. This architecture may provide for control over a significantly increased number of independent functions.

FIG. 2 is a schematic drawing showing an exemplary circuit 106 for providing enhanced functionality based on signals received from both the first control element 102 and the second control element 104. As shown in FIG. 2, electrical signals output from the first control element 102 and second control element 104 are received by a logical controller 122. Both the first control element 102 and the second control element 104 are in communication with the logical controller 122 and are configured for communicating a respective first output signal and second output signal to the logical controller 122. In an exemplary embodiment, the logical controller 122 is configured to actuate either a first output switch 124, a second output switch 126, or a third output switch 128 depending upon the combination of inputs (i.e., the first output signal and second output signal) it receives from the first control element 102 and the second control element 104.

The resistive switch ladder 106 includes a series of resistive elements (i.e., a first resistive element 130, a second resistive element 132, a third resistive element 134, a fourth resistive element 136, a fifth resistive element 138, a sixth resistive element 140, a seventh resistive element 142, and an eighth resistive element 144) coupled in series between a power source 146 and an end node 148. The third control element 110 is configured as a switch electrically coupled between a first intermediate node 150 and an output node 152. The first intermediate node 150 is positioned on the conductive path between the first resistive element 130 and the second resistive element 132.

The first output switch 124 is electrically coupled between a second intermediate node 154 and the output node 152. The second intermediate node 154 is coupled between the second resistive element 132 and the third resistive element 134. The second output switch 126 is electrically coupled between a third intermediate node 156 and the output node 152. The third intermediate node 156 is coupled between the third resistive element 134 and the fourth resistive element 136. The fourth control element 112 is electrically coupled between a fourth intermediate node 158 and the output node 152. The fourth intermediate node 158 is coupled between the fourth resistive element 136 and the fifth resistive element 138.

The fifth control element 114 is electrically coupled between a fifth intermediate node 160 and the output node 152. The fifth intermediate node 160 is coupled between the fifth resistive element 138 and the sixth resistive element 140. The sixth control element 116 is electrically coupled between a sixth intermediate node 162 and the output node 152. The sixth intermediate node 162 is coupled between the sixth resistive element 140 and the seventh resistive element 142. The seventh control element 118 is electrically coupled between a seventh intermediate node 164 and the output node 152. The seventh intermediate node 164 is coupled between the seventh resistive element 142 and the eighth resistive element 144. Finally, the third output switch 128 is electrically coupled between the end node 148 and the output node 152. The output node is coupled to a ground node 166 through a ground resistor 168. The output node 152 provides a single output 108 from the circuit 106 to an analog to digital converter 170.

In an exemplary embodiment, the first output switch 124 is activated when the vehicle operator actuates only the first control element 102. In an exemplary embodiment, the second output switch 126 is activated when the vehicle operator actuates only the second control element 104. In an exemplary embodiment, the third output switch 128 is activated when the vehicle operator actuates both the first control element 102 and the second control element 104.

Figure 3:
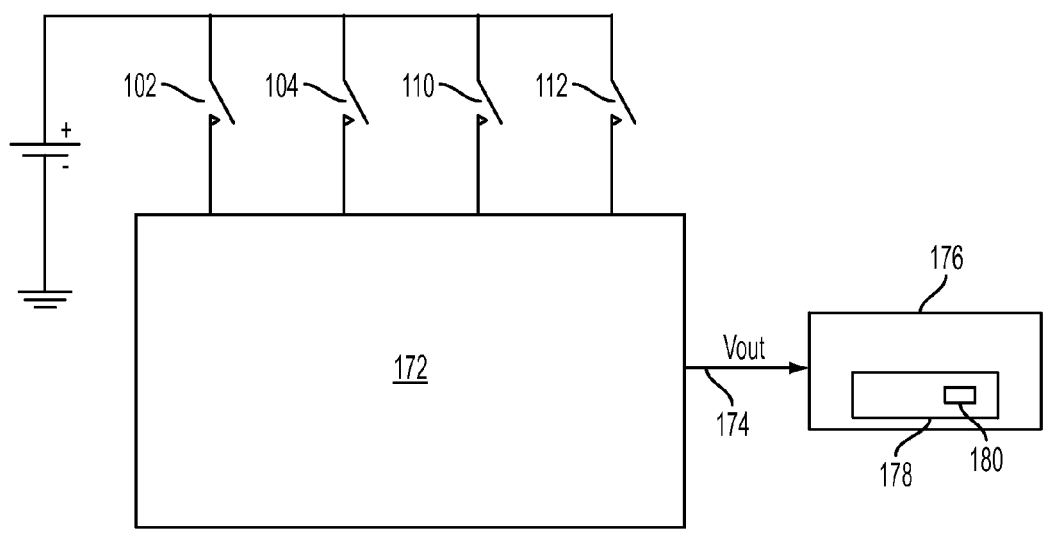
FIG. 3 is a simplified schematic drawing showing an exemplary circuit for providing enhanced functionality.

FIG. 3 is a simplified schematic drawing showing an exemplary circuit for providing enhanced functionality. In an exemplary embodiment, as shown in FIG. 3, simultaneous actuation (i.e., activation) of control elements (e.g., simultaneous pushbutton assertion) can be achieved by leveraging a digital to analog converter circuit. In an exemplary embodiment, the first control element 102, the second control element 104, the third control element 110, and the fourth control element are arranged as parallel inputs into a digital-to-analog converter 172. The digital-to-analog converter 172 is configured so as to produce an output signal 174 that is indicative of the combination of inputs from the first control element 102, the second control element 104, the third control element 110, and the fourth control element. Thus, the digital-to-analog converter 172 is configured such that the output signal 174 produced by the digital-to-analog converter 172 has a unique value for each activated switch and each combination of activated switches. The output signal 174 is delivered as an analog input (i.e., an analog signal) to a micro-controller 176. The micro-controller 176 is coupled to a memory 178 for executing software instructions 180 stored thereon. Accordingly, changes and/or additions in functionality can be accommodated merely by modifying the software instructions 180 executed by the micro-controller 176 without the need for additional control elements.

Accordingly, the described system provides for control over a first quantity of functions using a second quantity of control elements, where the first quantity exceeds the second quantity. As a result, a steering wheel assembly may include a plurality of control elements with each of the control elements being configured, when actuated, to facilitate a corresponding vehicle function. In addition, at least two of the control elements may be configured, when actuated in combination, to facilitate an additional vehicle function. By enabling additional functions through the simultaneous assertion of two or more pushbuttons, additional controls can be facilitated without consuming excess space on the steering wheel. For example simultaneous actuation of two control elements maybe used to facilitate adjustment of the steering column assembly such as by releasing a steering column adjustment lock.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering wheel assembly comprising:
    a plurality of control elements disposed on a user-accessible surface of the steering wheel assembly;
    each of the plurality of control elements having a plurality of user-selectable operational states;
    each of the plurality of control elements being electrically coupled to a digital-to-analog converter;
    each of the plurality of control elements being configured to provide an input signal to the digital-to-analog converter indicative of its respective user-selectable operational state;
    each of the plurality of control elements being electrically coupled to a corresponding branch of an electric circuit;
    the electric circuit defining an output node and being configured to produce a single output signal at the output node;
    each of the plurality of control elements being configured for affecting the single output signal based on an active one of the plurality of user-selectable operational states of the respective one of the plurality of control elements;
    the single output signal being indicative of the active ones of the plurality of user-selectable operational states for each of the plurality of control elements.

2. The steering wheel assembly of claim 1, wherein the plurality of control elements comprises a first control element and a second control element, both the first control element and the second control element comprising a push button configured as an electrical switch.

3. The steering wheel assembly of claim 2, wherein the first control element and the second control element are configured such that, when in an active state, each corresponding electrical switch is closed.

4. The steering wheel assembly of claim 2, wherein first control element and the second control element are configured such that, when in an inactive state, each corresponding electrical switch is open.

5. The steering wheel assembly of claim 1, wherein the output node is coupled to a controller, and wherein the single output signal is configured to affect operation of one or more features of a vehicle entertainment system that is in communication with the controller.

6. The steering wheel assembly of claim 1, wherein the output node is coupled to a controller, and wherein the single output signal is configured to affect operation of one or more features of a climate control system that is in communication with the controller.

7. The steering wheel assembly of claim 1, wherein the output node is coupled to a controller, and wherein the single output signal is configured to affect operation of one or more features of a vehicle lighting system that is in communication with the controller.

8. The steering wheel assembly of claim 1:
    wherein the plurality of control elements are arranged in parallel.

9. The steering wheel assembly of claim 8, wherein the digital-to-analog converter is configured so as to produce a single output signal that is indicative of the respective user-selectable operational state of each of the plurality of control elements.

10. The steering wheel assembly of claim 9, wherein the single output signal is an analog signal.

11. The steering wheel assembly of claim 8, wherein the output node is coupled to a micro-controller.

12. The steering wheel assembly of claim 11:
    wherein the micro-controller comprises a microprocessor coupled to a memory; and
    wherein the microprocessor is configured for executing software instructions stored in the memory.

13. The steering wheel assembly of claim 12, wherein the software instructions are configured such that a simultaneous actuation of a predefined two of the plurality of control elements causes the microprocessor to facilitate adjustment of a steering column assembly.

14. A steering wheel assembly comprising:
    a plurality of control elements disposed on a user-accessible surface of the steering wheel assembly;
    each of the plurality of control elements having a plurality of user-selectable operational states;
    each of the plurality of control elements being electrically coupled to a corresponding branch of an electric circuit;
    the electric circuit defining an output node and being configured to produce a single output signal at the output node;
    each of the plurality of control elements being configured for affecting the single output signal based on an active one of the plurality of user-selectable operational states of the respective one of the plurality of control elements;

the single output signal being indicative of active ones of the plurality of user-selectable operational states for each of the plurality of control elements;

wherein the plurality of control elements comprises a first control element and a second control element, both the first control element and the second control element comprising a push button configured as an electrical switch;

wherein the first control element is in communication with a logical controller and is configured for communicating a first output signal from the first control element to the logical controller;

wherein the second control element is in communication with the logical controller and is configured for communicating a second output signal from the second control element to the logical controller; and wherein the logical controller is configured to actuate, in dependence upon both the first output signal and the second output signal, either a first output switch, a second output switch, or a third output switch.

15. The steering wheel assembly of claim 14:

wherein the electric circuit comprises a resistive ladder comprising a plurality of resistive elements coupled in series between a power source and an end node and defining a plurality of intermediate nodes, each of the plurality of intermediate nodes being disposed between two resistive elements of the plurality of resistive elements;

wherein the first output switch is electrically coupled between a first intermediate node and the output node, the first intermediate node being positioned between a first resistive element of the plurality of resistive elements and a second resistive element of the plurality of resistive elements;

wherein the second output switch is electrically coupled between a second intermediate node and the output node, the second intermediate node being positioned between the second resistive element of the plurality of resistive elements and a third resistive element of the plurality of resistive elements;

wherein the third output switch is electrically coupled between the end node and the output node;

wherein the output node is coupled to a ground node through a ground resistor; and wherein the output node is coupled to an analog to digital converter for communicating the single output signal to the analog to digital converter.

16. The steering wheel assembly of claim 15:

further comprising a third control element;

wherein the third control element is electrically coupled between a third intermediate node and the output node, the third intermediate node being positioned between the third resistive element of the plurality of resistive elements and a fourth resistive element of the plurality of resistive elements.

17. The steering wheel assembly of claim 16:

further comprising a fourth control element;

wherein the fourth control element is electrically coupled between a fourth intermediate node and the output node, the fourth intermediate node being positioned between the fourth resistive element of the plurality of resistive elements and a fifth resistive element of the plurality of resistive elements.

18. The steering wheel assembly of claim 17:

further comprising a fifth control element;

wherein the fifth control element is electrically coupled between a fifth intermediate node and the output node, the fifth intermediate node being positioned between the fifth resistive element of the plurality of resistive elements and a sixth resistive element of the plurality of resistive elements.

19. The steering wheel assembly of claim 18:

further comprising a sixth control element;

wherein the sixth control element is electrically coupled between a sixth intermediate node and the output node, the sixth intermediate node being positioned between the sixth resistive element of the plurality of resistive elements and a seventh resistive element of the plurality of resistive elements.

* * * * *